United States Patent
Adair

[11] 3,993,421
[45] Nov. 23, 1976

[54] CONTROL SYSTEM FOR DYNAMIC EXTRUDER

[75] Inventor: James G. Adair, Pasadena, Tex.

[73] Assignee: Phillips Petroleum Company, Bartlesville, Okla.

[22] Filed: Sept. 5, 1974

[21] Appl. No.: 503,319

[52] U.S. Cl. .............................. 425/145; 425/149; 425/380
[51] Int. Cl.² ......................................... B29D 23/04
[58] Field of Search ............... 264/40, 25; 425/145, 425/146, 149, 380, 381, 150, 136, 378, 379, 466, 467

[56] References Cited
UNITED STATES PATENTS

| | | | |
|---|---|---|---|
| 2,369,553 | 2/1945 | Fields | 425/136 |
| 3,309,436 | 3/1967 | Larsen | 264/25 |
| 3,382,220 | 5/1968 | Bowman, Jr. | 425/380 X |
| 3,526,926 | 9/1970 | Reid | 425/149 |
| 3,711,232 | 1/1973 | van Zon | 425/150 |
| 3,799,719 | 3/1974 | Bonikowski et al. | 425/149 |

*Primary Examiner*—Francis S. Husar
*Assistant Examiner*—Mark Rosenbaum

[57] ABSTRACT

A control system for a dynamic extruder wherein the pressure of the plastic melt is monitored and compared to a set point. When the melt pressure is equal to or greater than the set point, the supply of plastic to the extruder is halted, thereby preventing any increase in melt pressure and thereby precluding rupture of the extrusion die due to excess pressure.

4 Claims, 2 Drawing Figures

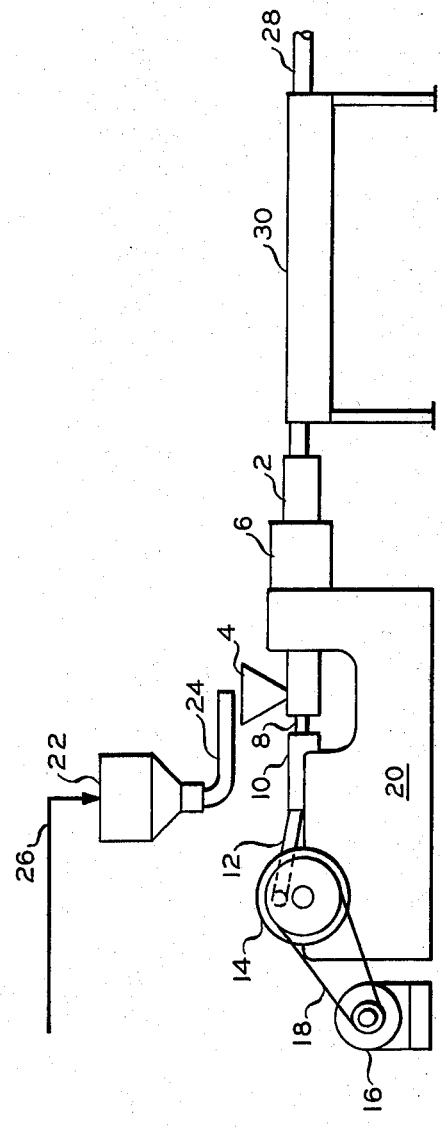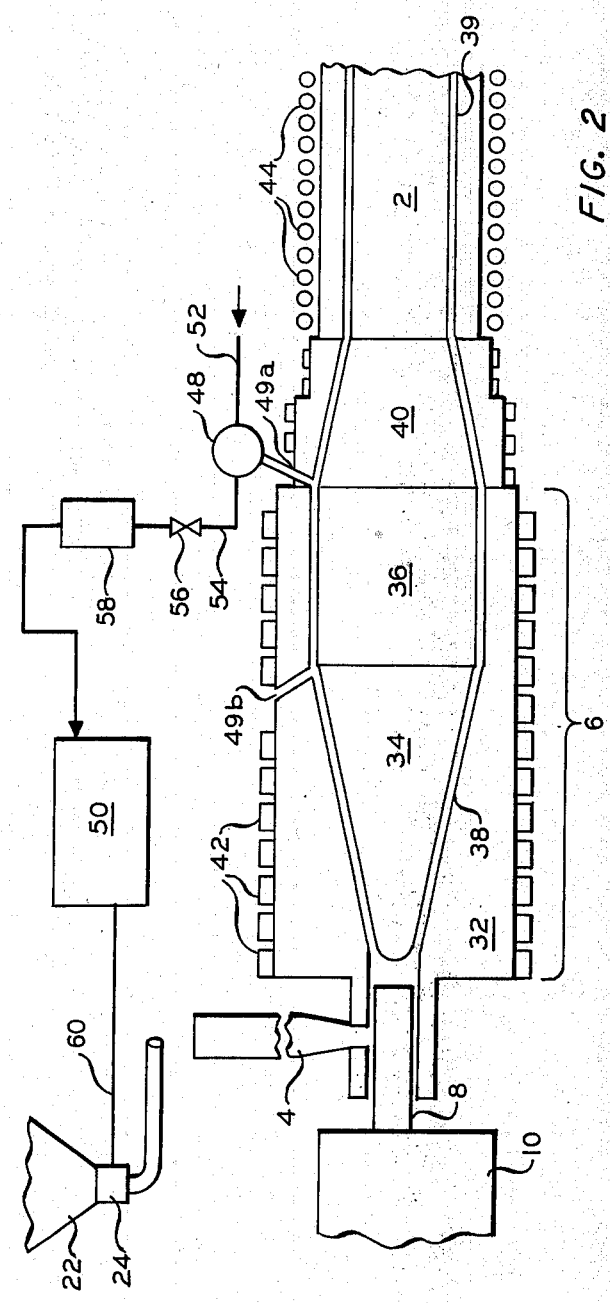

CONTROL SYSTEM FOR DYNAMIC EXTRUDER

This invention relates to extrusion of thermoplastics. In one aspect the invention relates to a control system for preventing damage to an extrusion die due to excessive pressure.

Extrusion is a frequently used technique for producing elongated profile shapes. It is often used, for example, in the production of pipe or tubing or other cross-sectional configurations from thermoplastic materials such as nylon, polyvinyl acetate, polyvinyl chloride and polyolefins, for example, polyethylene, polypropylene, and copolymers of these or other polyolefins or mixtures of two or more materials. The extrusion procedure includes plasticizing, forming and setting.

Dynamic extrusion is a process wherein a plastic mass is forced, by means of a reciprocating piston, through a cool zone, then into a heated zone to melt the plastic mass, then to a mixing section and a long land die, in which the shape takes form and is cooled to a solid or near solid state prior to leaving the die.

In the event the plastic mass is not heated to its proper extrusion temperature, as where the feed rate is too high, where one or more heaters fail to function properly or during startup, the design stress of the die can be exceeded, with resultant rupture of the die. The problem is especially acute during startup when the material in the heated zone has previously been allowed to cool and solidify. The extruder operator can, of course, closely monitor extrusion pressure in the heated zone during startup; however, the pressure buildup in the extruder can be so sudden that the operator cannot react in time to prevent rupture of the die. During operation of the extruder, pressure can also increase too fast for the operator to react in time to prevent die rupture.

It is an object of this invention to provide a control system for a dynamic extruder.

It is another object to provide a novel dynamic extrusion apparatus.

It is a further object to provide a method for protecting the long land die of a dynamic extrusion apparatus from rupture due to excessive pressure.

These and other objects of the invention will become apparent to one skilled in the art from the following detailed description, the appended claims and the accompanying drawing wherein:

FIG. 1 is a diagrammatic illustration of an extrusion apparatus which can be used in conjunction with the control system of this invention; and FIG. 2 is a cross-sectional view of the extruder showing the control system of this invention.

In accordance with the present invention there is provided a control system for a dynamic extruder which protects the extrusion die from rupture due to excessive pressure within the extruder apparatus. There is further provided a dynamic extrusion apparatus incorporating the control system of the present invention and a method for preventing rupture of the long land die of a dynamic extrusion apparatus due to excessive pressure of the plastic melt within the apparatus.

Specifically, the control system of the present invention comprises a signal means adapted to provide a signal $P_M$ in accordance with the melt pressure of the plastic mass in the plasticizing zone of a dynamic extruder and a signal receiving and control means in communication with the signal means wherein the signal $P_M$ is compared with at least one set point. When signal $P_M$ is outside the allowable range determined by the set point or set points, the control means is adapted to stop the feeding means of the extruder apparatus, thus stopping the flow of solid plastic material to the feed section of the extruder apparatus. Interruption of the feed to the extruder permits the extrusion pressure to decrease to a safe range.

In a first embodiment of this invention the control means is adapted to compare signal $P_M$ to a set point $P_H$, the value of set point $P_H$ being lower than the design stress of the extruder die and to stop the feeding means when $P_M$ is equal to or greater than $P_H$. Thus, in accordance with the present invention, when the melt pressure of the plastic mass within the plasticizing zone is equal to or exceeds a predetermined value, the means supplying solid plastic material to the extruder is stopped, thus stopping the feed to the extruder.

In a second embodiment of this invention, the control means is further adapted to compare the signal $P_M$ with a second set point $P_L$, the value of $P_L$ being lower than the normal operating pressure of the apparatus, and to stop the feeding means when $P_M$ is equal to or less than $P_L$. In this embodiment, material feed to the extruder is stopped when the signal $P_M$ is equal to or less than set point $P_L$, as would be the situation should the pressure-responsive element fail to function properly.

In another embodiment of this invention, a means for averaging signal $P_M$ is disposed between the pressure-responsive element and the control means. Due to the nature of the dynamic extruder, pressure upon the plastic mass is alternately applied and relaxed as the piston reciprocates. Thus during the forward stroke of the piston, the pressure of the plastic mass is greater than the pressure during the piston's backstroke. Without such averaging means, set point $P_H$ must be empirically determined; by incorporating such averaging means, set point $P_H$ can be set in accordance with the design stress of the die.

In yet another embodiment of this invention the control means is further adapted to compare the signal $P_M$ with a set point $P_h$, which is lower than set point $P_H$, and greater than the normal operating pressure of the apparatus and to activate an alarm means when $P_M$ is equal to or greater than set point $P_h$ but less than set point $P_H$, thus providing a warning that $P_M$ is approaching $P_H$.

In a further embodiment, the control means is adapted to compare the signal $P_M$ with a set point $P_l$, which is higher than set point $P_L$ and less than the normal operating pressure of the apparatus, and to activate an alarm means when $P_M$ is equal to or less than set point $P_l$, but greater than $P_L$, thus providing a warning that $P_M$ is approaching $P_L$.

The extrusion apparatus comprises first, second, third and fourth zones as hereinafter described, feeding means for feeding a solid, extrudable plastic material to the extrusion apparatus and reciprocating means to force the plastic material into and through the extrusion apparatus. In the first zone a plastic melt is formed into a desired cross-sectional area and maintained in the desired shape until solidified. This first zone is generally a long land die having a land length of 10 to 100 times the thickness of the profile.

In the second zone, the plastic melt is plasticated, i.e., the melt is thoroughly admixed or kneaded in preparation for extrusion. In the third zone, the plastic material is heated to form a plastic melt; and the fourth zone comprises the feed input section of the extruder apparatus.

In association with the second zone, there is generally a flow control means to ensure that material flow is unidirectional within the extruder.

In association with the first zone are means to provide a smoothly decreasing temperature gradient along the first zone. The plastic mass is in the melted state as it enters the first zone and must be solidified prior to removal from the first zone.

Heating means are provided in association with the third zone to heat the plastic material to a melted state.

Plastic material is supplied to the first zone by a feeding means which can be a vibratory feeder, a screw feeder or other means known in the art.

Referring now to FIG. 1, the extrusion apparatus comprises a long land die 2, a feed hopper 4, a plasticizing and flow control means 6, a plunger 8 attached to crosshead 10, a connecting rod 12, and a fly wheel 14, driven by motor 16 by means of belt 18. The entire extrusion apparatus is supported on a base 20. A supply hopper 22 and feeder 24 supply pellets of extrudable thermoplastic to feed hopper 4, the plastic being supplied to hopper 22 from a suitable source, such as indicated diagrammatically by line 26. The extrudate is illustrated by the elongated portion 28. The diagrammatic representation 30 represents other suitable apparatus such as water coolers, brakes, supports, etc., which are supplied as desired.

As illustrated in FIG. 2, the plasticizing and flow control means 6 comprises a body 32, a flow control mandrel 34, and a plasticizing mandrel 36. It is seen that mandrels 34 and 36, together with body 32, define an annular passage 38. The plasticizing and flow control means further comprise a transition mandrel 40 which serves to adapt annular passage 38 to the annular passage 39 defined by die 2. There are illustrated a plurality of heaters 42 on the exterior of body 32. Heaters can also be provided in the interiors of mandrels 34 and 36.

The flow of the plastic mass through that portion of the apparatus illustrated in FIG. 2 is from left to right. Shown on the exterior of die 2 are means 44 for providing a smoothly decreasing temperature gradient along the die to solidify the melt prior to removing the shaped article from the die.

The control system shown in FIG. 2 comprises a signal means 48 in the annular passage 38 adapted to provide a signal $P_M$ in accordance with the melt pressure of the plastic mass in the plasticizing zone of the extruder, and signal receiving and control means 50 in communication with signal means 48 in further communication with feeder 24. Control means 50 is adapted to compare signal $P_M$ with a set point $P_H$ and to stop feeder 24 when $P_M$ is equal to or greater than $P_H$.

Control means 50 can also be adapted to compare signal $P_M$ with a set point $P_L$ and to stop feeder 24 when $P_M$ is equal to or less than $P_L$. Control means 50 can further be adapted to compare signal $P_M$ to set points $P_h$ and $P_l$ and to activate an alarm means when $P_M$ is outside the range of $P_l$ to $P_h$, i.e. $P_l \geqslant P_M \geqslant P_h$, thus providing a warning that $P_M$ is approaching $P_L$ or $P_H$.

The set points $P_H$ and $P_h$ are determined in accordance with the design stress of the long land die. Since it is important that the design stress not be exceeded, $P_H$ is generally set lower than the design stress in order to provide a safety factor. For example, in a typical operation of a dynamic extruder wherein the long land die has a design stress of 5,000 psi, the melt pressure of the plastic mass is in the approximate range of 1,000 to 1,500 psi. Control means 50 is set to provide an alarm signal when the melt pressure is about 3,000 psi and to shut off the supply of plastic to the extruder when the melt pressure is in the approximate range of 3,500 to 4,000 psi. Thus, set point $P_H$ is proportional to the upper range of 3,500 to 4,000 psi and set point $P_h$ is proportional to 3,000 psi.

The low set point $P_L$ and low alarm set point $P_l$ are set below the normal operating melt pressure. These settings are not considered to be critical. Their functions are to indicate failure of the pressure-responsive element and/or loss of power to the pressure-responsive element.

Pressure responsive element 48 should be located so that it will be responsive to the pressure of the plastic melt. In this regard, it is preferred that the element 48 be located in communication with annular passage 38 at or near the zone defined by the plasticizing mandrel 36. Two possible locations, 49a and 49b, are shown in FIG. 2. Of the two, location 49a is presently preferred since the melt pressure at this point is more representative of the pressure at the inlet end of long land die 2.

In the embodiment illustrated in FIG. 2, the control system is electro-pneumatic. Air pressure, from a source not shown, is supplied through conduit 52 to signal means 48 which provides a signal $P_M$ relative to the melt pressure within annular passage 38, through conduit 54, valve 56 and surge tank 58 to control means 50. Valve 56 and surge tank 58 are provided in conduit 54 to smooth out, i.e., to average, the signal $P_M$. Within control means 50 signal $P_M$ is compared to set points $P_H$ and $P_L$. Line 60 represents one of the electric power leads to feeding means 24. Where signal $P_M$ is outside the range $P_L$ to $P_H$, electric power to feeder 24 via line 60 is interrupted in control means 50 and the supply of plastic to feed hopper 4 is halted.

In one instance, feeder 24 was a Syntron Vibratory Feeder Model F-T01, signal means 48 was a Rosemont Pressure Transmitter Model 1401A-3D2 with a receiver gauge 0-10,000 psi range, signal receiving and control means 50 was a Rosemont Model 1403-1 adjustable pressure switch with two sets of contacts individually adjustable to a pneumatic signal of from 0-30 psi. One set of points was set to close, sounding an alarm when the pneumatic signal $P_M$ indicated the pressure had reached 3000 psi, and the second set of points was set to open when the pneumatic signal indicated the pressure had reached 3,500, interrupting the power supply to the Syntron Vibratory Feeder.

Although not used in the specific instance previously described, an adjustable pressure switch for the low alarm set point $P_l$ and low set point $P_L$ can be a separate control with one set of points set to close, sounding an alarm when the pneumatic signal $P_M$ indicates the pressure has dropped to 500 psi, and the second set of points set to open when the pressure has dropped further to 200 psi, interrupting the power supply to the vibrator feeder. The adjustable pressure switch for the low pressure alarm and set point could be combined with the high pressure alarm and set point if desired.

While the control system of this invention has been described in terms of an electro-pneumatic system, it will be appreciated that all electric and all pneumatic or hydraulic systems can also be employed. Other features which can be employed in the control system of this invention such as manual override for startup, alarm warning systems, visual indication of melt pressure and the like will be apparent to those skilled in the art.

Reasonable variations and modifications of this invention can be made or followed, in view of the foregoing disclosure, without departing from the spirit or scope thereof.

What is claimed is:

1. A dynamic extrusion apparatus comprising: a housing and a die means having a mandrel therein and defining first, second, third, and fourth zones;
   a. in said first zone a plastic melt is formed into a desired cross-sectional shape and maintained in said shape until solidified;
   b. a second zone in operable communication with said first zone wherein said plastic melt is plasticated;
   c. said third zone in operable communication with said second zone wherein a plastic material is heated to form said plastic melt;
   d. said fourth zone in operable communication with said third zone wherein said plastic material is introduced to said apparatus;
   e. heating means in association with said third zone for heating said plastic material to a melted state;
   f. means providing a smoothly decreasing temperature gradient along said first zone;
   g. a reciprocating means communicating with said fourth zone to force said plastic material through said third and second zones into said first zone;
   h. feeding means for feeding said plastic material to said fourth zone;
   i. signal means in operable communication with said second zone to measure pressure of plastic melt in said second zone and provide a signal $P_M$;
   j. signal receiving and control means in communication with said signal means adapted to receive said signal $P_M$ and to compare said signal to a set point $P_H$, the value of said set point $P_H$ being lower than the design stress of said first zone, said means being in further communication with said feeding means and adapted to stop said feeding means when said signal $P_M$ is equal to or greater than set point $P_H$, thereby stopping the flow of said plastic material to said fourth zone.

2. The apparatus of claim 1 wherein said control means is further adapted to compare said signal $P_M$ to a set point $P_L$, the value of said set point $P_L$ being lower than the normal operating pressure of said apparatus, and adapted to stop said feeding means when said signal $P_M$ is equal to or less than said set point $P_L$.

3. The apparatus of claim 2 wherein said control means is further adapted to compare said signal $P_M$ to a set point $P_h$, the value of said set point $P_h$ being less than said set point $P_H$ and greater than the normal operating pressure of said apparatus and adapted to activate an alarm means when said signal $P_M$ is equal to or greater than said set point $P_h$.

4. The apparatus of claim 3 wherein said control means is further adapted to compare said signal $P_M$ to a set point $P_l$, the value of said set point $P_l$ being greater than said set point $P_L$ and less than the normal operating pressure of said apparatus and adapted to activate an alarm means when said signal $P_M$ is equal to or less than said set point $P_l$.

* * * * *